US008538188B2

(12) United States Patent
Watkins et al.

(10) Patent No.: US 8,538,188 B2
(45) Date of Patent: Sep. 17, 2013

(54) METHOD AND APPARATUS FOR TRANSFERRING AND RECONSTRUCTING AN IMAGE OF A COMPUTER READABLE MEDIUM

(75) Inventors: Kathryn R. Watkins, McLean, VA (US); Michael McWhorter, Woodbridge, VA (US); William H. Hill, Vienna, VA (US); Jeffrey W. Long, Westford, MA (US); Christian Shrauder, Haymarket, VA (US)

(73) Assignee: Mitre Corporation, McLean, VA (US)

( * ) Notice: Subject to any disclaimer, the term of this patent is extended or adjusted under 35 U.S.C. 154(b) by 1062 days.

(21) Appl. No.: 12/535,126

(22) Filed: Aug. 4, 2009

(65) Prior Publication Data

US 2011/0033128 A1 Feb. 10, 2011

(51) Int. Cl.
*G06K 9/42* (2006.01)

(52) U.S. Cl.
USPC .......................................................... 382/259

(58) Field of Classification Search
USPC ........ D14/485; 382/259; 707/602, 674–686, 707/698, 747, 821–831, E17.036, E17.052; 711/1–6, 100–173, 216, E12.018, E12.06; 714/6.1–6.3, 20, E11.113, E11.122
See application file for complete search history.

(56) References Cited

U.S. PATENT DOCUMENTS

| 7,424,498 | B1 | 9/2008 | Patterson |
| 7,430,744 | B2 | 9/2008 | Straube et al. |
| 7,444,372 | B2 | 10/2008 | Gupta et al. |
| 2008/0047016 | A1* | 2/2008 | Spoonamore ................... 726/25 |
| 2008/0133446 | A1 | 6/2008 | Dubnicki et al. |
| 2009/0164427 | A1* | 6/2009 | Shields et al. .................... 707/3 |
| 2010/0088318 | A1* | 4/2010 | Kan et al. ...................... 707/741 |

OTHER PUBLICATIONS

W. J. Bolosky, S. Corbin, D. Goebel, J. R. Douceur, "Single Instance Storage in Windows 2000," 4th USENIX Windows System Symposium, Aug. 2000.
B. Carrier, File System Forensic Analysis, Addison Wesley, Chapters 1, 3, 8, and 11, pp. 3-16, 47-66, 173-210, 273-299 (2005).
L. P. Cox, C. D. Murray, and B. D. Noble, "Pastiche: Making Backup Cheap and Easy," 5th Symposium on Operating Systems Design and Implementation, pp. 285-298, 2002.
H. Gilbert & H. Handschuh, "Security Analysis of SHA-256 and Sisters," Selected Areas in Cryptography: 10th Annual International Workshop, SAC 2003, Ottawa, CANADA, Aug. 14-15, 2003, Revised Papers, vol. 10, pp. 175-193 (2004).

(Continued)

*Primary Examiner* — Gregory F Cunningham
(74) *Attorney, Agent, or Firm* — Proskauer Rose LLP

(57) ABSTRACT

A forensically sound image of a computer readable storage medium can be transferred across a low bandwidth communications network. The method can include the step of scanning an image of the computer readable storage medium for redundant data, the redundant data duplicative of locally stored data. The method can also include generating a skeleton image based on the image of the computer readable storage medium by excluding the redundant data from the image of the computer readable storage medium. The method can include transmitting, by a transmitting device, the skeleton image over the communications network to a receiving device to enable reconstruction of an image copy of the computer readable storage medium using the skeleton image and the locally stored data. A receiving device can reconstruct a bit-for-bit copy of the image of the computer readable storage medium.

20 Claims, 3 Drawing Sheets

(56) References Cited

OTHER PUBLICATIONS

U. Manber, "Finding Similar Files in a large File System," Proceedings of the USENIX Winter Technical Conference, 17.21 1994.

Murr, Michael, "Forensically Sound Duplicate," Forensic Computing, Aug. 2, 2006, <http://forensiccomputing.blogspot.com/2006/08/forensically-sound-duplicate.html>.

A.Muthitacharoen, B. Chen, and D.Mazières, "A Low-bandwidth Network File System.," in Proc. 18th SOSP, Oct. 2001.

E.H. McKinney, "Generalized Birthday Problem," The American Mathematical Monthly, vol. 73, No. 4, Mathematical Association of America, pp. 385-387 (1966).

M. Naor and M. Yung, "Universal One-Way Hash Functions and their Cryptographic Applications," 21st Annual ACM Symposium on Theory of Computing, pp. 33-43 (1989).

C. Policroniades and I. Pratt, "Alternatives for Detecting Redundancy in Storage Systems Data," Proceedings of the 2004 USENIX Conference, Jun. 2004.

S. Quinlan and S. Dorward, "Venti: a new approach to archival storage," Proc. of the Conference on File and Storage Technologies (FAST), Jan. 2002.

B. Schneier, Applied Cryptography (2nd Edition). John Wiley & Sons, Chapters 7 and 18, pp. 151-168 & 429-459 (1996).

N. Tolia, M. Kozuch, M. Satyanarayanan, B. Karp, T. Bressoud, and A. Perrig, "Opportunistic Use of Content Addressable Storage for Distributed File Systems," Proceedings of the 2003 USENIX Annual Technical Conference, pp. 127-140, May 2003.

A.Tridgell and P. Mackerras, "The rsync algorithm," Tech. Rep. TR-CS-96-05, Australian National University, 1997.

\* cited by examiner

METHOD AND APPARATUS FOR TRANSFERRING AND RECONSTRUCTING AN IMAGE OF A COMPUTER READABLE MEDIUM

FIELD OF THE INVENTION

The invention relates to methods and apparatuses for optimized transfer and reconstruction of an image of a computer readable medium (e.g., disks and/or drives).

BACKGROUND OF THE INVENTION

Entities (e.g., law enforcement entities) often obtain hard drive images for analysis over bandwidth limited WAN connections. When no additional technologies can be applied to increase the speed of the connection and no additional bandwidth can be attained, critical operations that rely on intelligence gathered from the timely analysis of drives are hindered. Improving the transmission process can result, for example, in tactical gains for law enforcement.

Although it might seem that one solution would compare files on the remote client hard drive to a list of existing files at the server side and send the difference, this approach would not create a forensic duplicate of the drive image and would miss analytically significant information that is outside of the file system, such as slack space data or deleted/partial files.

SUMMARY OF THE INVENTION

Minimizing the transfer of unnecessary data when sending images of a computer readable medium (e.g., drive images) from, for example, a remote client location back to a central site over a communications network, results in an optimized transfer and reconstruction of files. For example, data such as operating system files, applications, and media files are likely to exist on many hard drives. Common data from local stores (e.g., data stored on the central site) can be combined with unique data from the remote site (e.g., unique data in the image of a computer readable medium on the remote site) to create new, forensically sound media images. To enable a forensically sound copy, a solution can work directly with disk blocks. A "forensically sound" image as use herein refers to a bit-for-bit copy of the image. Data that can be used from local stores need not be sent over a communications network (e.g., link), thereby minimizing the transfer of unnecessary data and substantially reducing amounts of data transmitted between the two sites (e.g., the remote site and the central site) and stored at the central location. The transfer and reconstruction of the image can be at the disk level. However, critical insights gained from understanding the file system geometry can support performance improvements.

In one aspect, the invention features a method for transferring a forensically sound image of a computer readable storage medium across a low bandwidth communications network. The method can include the step of scanning an image of the computer readable storage medium for redundant data, the redundant data duplicative of locally stored data. The method can also include generating a skeleton image based on the image of the computer readable storage medium by excluding the redundant data from the image of the computer readable storage medium. A transmitting device can transmit the skeleton image over the communications network to a receiving device to enable reconstruction of an image copy of the computer readable storage medium using the skeleton image and the locally stored data.

The step of generating a skeleton image can include excluding the redundant data by including a hash value in place of (e.g., instead of) the redundant data (e.g., instead of the data itself) in the skeleton image. In some embodiments, the method also includes scanning the image of the computer readable storage medium for redundant files, redundant file sequences or redundant disk clusters duplicative of locally stored files, locally stored file sequences or locally stored disk clusters. The skeleton image can be generated by excluding data corresponding to empty or patterned space in the computer readable storage medium. The locally stored data can be stored on the receiving device.

The method can also include transmitting a location identifier that specifies a location on the image of the computer readable storage medium and a hash for a redundant file, redundant file sequence, redundant disk cluster, empty space, patterned space or any combination thereof. Data corresponding to slack space identifying an end of the redundant file can also be transmitted.

In some embodiments, the skeleton image is transmitted over the communications network using a transmission protocol.

The method can also include the step of comparing hashes of files, hashes of file sequences or hashes of disk clusters in the image of the computer readable storage medium with a database of locally stored hashes of files, locally stored hashes of file sequences or locally stored hashes of disk clusters to identify redundant data in the image of the computer readable storage medium.

In some embodiments, the receiving device reconstructs the image copy of the computer readable storage medium using a database of locally stored hashes of files, locally stored hashes of file sequences or locally stored hashes of disk clusters. The receiving device can reconstruct the image copy of the computer readable storage medium by inserting the locally stored data in the skeleton image, the locally stored data duplicative of the redundant data excluded by the transmitting device.

The image copy can be a bit-for-bit copy of the image of the computer readable medium (e.g., a forensically sound copy).

In another aspect, the invention features a method for reconstructing a bit-for-bit copy of an image of a computer readable medium. The method can include the step of receiving a skeleton image via a communications network. The skeleton image can be generated by excluding redundant data duplicative of locally stored data from the image of the computer readable medium. The method also includes receiving at least one hash value for the redundant data and at least one location identifier specifying a location of the redundant data on the image of the computer readable medium. The method can include reconstructing a bit-for-bit copy of the image of the computer readable medium by compiling the locally stored data with the skeleton image based, at least in part, on the received hash value of the redundant data and the received location identifier of the redundant data.

In some embodiments, the method includes the step of receiving at least one hash value or at least one location identifier for at least one of a redundant file, redundant file sequence, redundant disk cluster, empty space or patterned space. The method can also include retrieving locally stored data based on the received hash value of the redundant data.

In yet another aspect, the invention features a computer program product, tangibly embodied in a computer readable storage medium, for transferring a forensically sound image of a second computer readable storage medium across a communications network. The computer program product can include instructions operable to cause a data processing apparatus to scan an image of the second computer readable storage medium for redundant data, the redundant data duplicative of locally stored data. A skeleton image can be generated based on the image of the second computer readable storage medium by excluding the redundant data from the image of the second computer readable storage medium. A transmitting device can transmit the skeleton image over the communications network to a receiving device to enable reconstruction of an image copy of the second computer readable storage medium using the skeleton image and the locally stored data.

In some embodiments, the skeleton image is generated by including a hash value in place of (e.g., instead of) the redundant data (e.g., excluding the redundant data and instead including a hash value).

In another aspect, the invention features a computer program product, tangibly embodied in a computer readable storage medium, for reconstructing a bit-for-bit copy of a second computer readable storage medium. The computer program product can include instructions operable to cause a data processing apparatus to receive a skeleton image transmitted via a communications network. The skeleton image can be generated by excluding redundant data from the image of the second computer readable medium, the redundant data duplicative of locally stored data. At least one hash value for the redundant data and at least one location identifier specifying a location of the redundant data on the image of the second computer readable medium can be received. A bit-for-bit copy of the image of the second computer readable medium can be reconstructed by compiling the locally stored data with the skeleton image, based, at least in part, on the received hash value of the redundant data and the received location identifier of the redundant data.

In yet another aspect, the invention features a method for transferring an image of a computer readable storage medium across a low bandwidth communications network. The method can include scanning the image of the computer readable storage medium for known data and generating a skeleton image of the image of the computer readable storage medium by excluding the known data from the image of the computer readable storage medium so that skeleton image includes unknown data in the computer readable storage medium. A transmitting device can transmit the skeleton image over the communications network to a receiving device to enable analysis of the skeleton image.

The step of generating a skeleton image can include including a hash value in place of (e.g., instead of) the known data in the skeleton image (e.g., instead of the data itself) and including unknown data in the skeleton image. In some embodiments, the method includes excluding data corresponding to empty or patterned space in the computer readable storage medium to generate the skeleton image. The method can also include transmitting the skeleton image, a hash value for the known data, and a location identifier that specifies a location of the known data in the image of the computer readable storage medium. The method can also include scanning the image of the computer readable storage medium for known files, known file sequences or known disk clusters.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
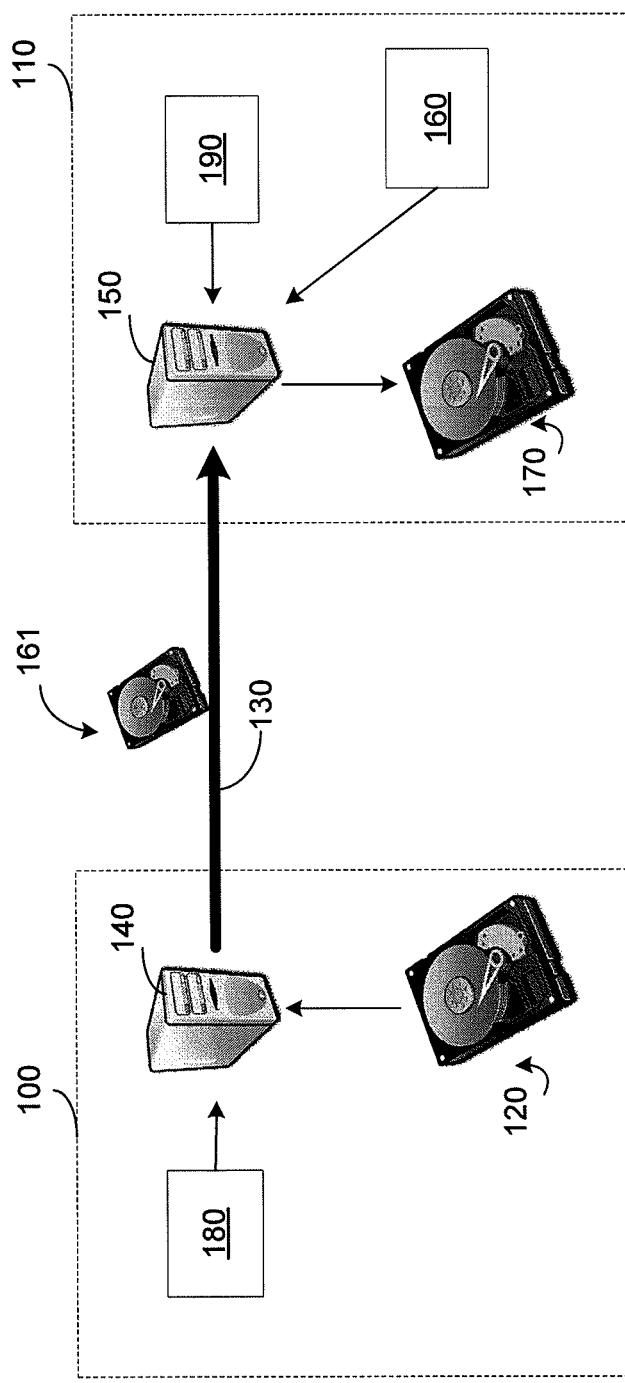
FIG. 1 is a schematic of a system for transferring and reconstructing a drive image, according to an illustrative embodiment of the invention.

FIG. 1 is a schematic of a system for transferring and reconstructing an image of a computer readable medium (e.g., a drive/disk image), according to an illustrative embodiment of the invention. The system can include, for example, remote site 100 and a central site 110. Data from an image of a computer readable storage medium 120 (e.g., drive/disk image) on the remote site 100 can be transferred from the remote client location 100 back to a central site 110 over a communications network 130. The remote site 100 can include a transmitting device 140 and the central site 110 can include a receiving device 150. The central site 110 can include local stores of data 160 (e.g., locally stored files, file sequences, disk clusters, empty space or patterned space). The data stored on the central site 110 can include operating system files, applications, and media files. An original image 120 of a computer readable storage medium (e.g., disk/drive image) on the remote site 100 can be processed to generate a skeleton image 161 that is transmitted by a transmitting device 140 via a communications network 130 (e.g., link) to the receiving device 150 at the central site 110. The image 120 can be processed to exclude redundant data to generate the skeleton 161 image. Redundant data can be defined as data duplicative of the local stores of data 160. The central device (e.g., receiving device 150) can incorporate common data from local stores 160 (e.g., data stored on the central site 110) with unique data from the remote site 100 (e.g., in the skeleton image 161) to create new, forensically sound media image copies 170. Since data that can be retrieved and used from local stores 160 is not transferred over the communications network 130, the amount of data that is transferred over the communications network 130 can be thereby minimized. The remote site 100 and the central site 110 can include a database of hash values 180 and 190 (e.g., hash values for files, disk clusters, empty/patterned space, etc.).

Excluding redundant data can reduce an image disk/drive 120 to a minimal state by referencing the parts of the drive that already exist at a server-side or central site 110 (e.g., by using hash values from a database 180 or 190 of hashes of known/redundant data duplicative of local stores of data 160). It also provides a disk/drive image that needs minimal preprocessing before an analyst can begin work on the image while remaining forensically sound, thus analytically sound. A forensically sound image copy 170 can be defined as a bit-for-bit copy. A "forensically-sound" duplicate 170 of a drive/disk image can be defined as one created by a method which does not, in any way, alter any data on the drive/disk image 120 being duplicated. Second, a forensically-sound duplicate 170 contains a copy of every bit, byte and sector of the source drive/disk 120, including unallocated 'empty' space and slack space (e.g., trailing data following an end of a file), as such data appears on the source drive relative to the other data on the drive. Finally, a forensically-sound duplicate 170 should not contain data (except known filler characters) other than which was copied from the source drive/disk 120. An analytically sound image doesn't remove all possible previously seen data. Instead it allows analysts to skip initial and timely pre-conditioning steps that forensic tools take by excluding only known good (e.g., known file filter) data. This drive can still be rebuilt into a forensically sound duplicate 170 of the original (e.g., using local stores of data) but in its current state is ready for analysis. These outcomes are achieved individually with a specific implementation focused on either the minimalistic state or the analytic state depending on an entities needs or as a hybrid of the two.

By transmitting a skeleton image 161 that includes, at least in part, hashes of known data (e.g., known files/disk clusters corresponding to locally stored files/disk clusters 160) and hashes of empty or patterned space, minimal amounts of data can be transmitted via the communications network 130, thereby optimizing the transfer of an image. The process leverages data stores that forensic investigative entities already maintain. A single instance file storage (e.g., local stores of data 160) can be built from the current holdings. It can then forward/deploy hash databases 180 or 190 representative of the single instance storage to clients (e.g., transmitting device 140 of remote site 100 or receiving device 150 of central site 110). The clients 140 or 150 can then use these databases 189 and 190 to compare data on incoming drives 120 to those already stored at local stores 160 at the server side (e.g., central site 110). This architecture allows work that could previously only be conducted at the server side (e.g., central site 110) to be moved to the client (e.g., remote site 100).

Forensic analysis tools can perform a preprocessing of drives to narrow the base of analysis, for example, by redacting known files from the larger drive. Current forensic tools do this by maintaining a hash database of known files. Because they do not maintain the files that correspond to the hashes, this processing must be done by the analysis tool so that the drive image can be rebuilt upon completion of analysis. This pre-processing can be done at the client side (e.g., remote site 100) of the operation because it can maintain a copy of all known files (e.g., data stores 160) at the server side (e.g., central site 110) and because the remote site 100 maintains how the files are laid out on the drive being analyzed. In addition to eliminating the need to send known data (e.g., files, files or partial file), data that it has previously seen can also be identified. As a result, all files that contribute to reducing a drive to its analytic state can also be redacted when building the minimalistic state. Thus, known files identified by existing forensic programs as being insignificant to analysis can be flagged on the server side's (e.g., central site 110) database 190.

Three things are then possible when the server side (e.g., central site 110) receives a skeleton image 161. The drive/disk image 120 can be rebuilt to its original state (e.g., forensically sound image copy 170). Hashes of the original client disk/drive 120 and the resulting drive/disk 170 rebuilt from the skeleton image 161 were compared to prove forensic soundness. The skeleton image 161 can also be stored in the reduced state until needed for analysis. The server side (e.g., central site 110) can also rebuild the drive/disk image copy adding only files that it does not have marked with the analytic flag. This can build a drive/disk image copy that is immediately ready for analysis. All files that would be redacted during pre-processing with analysis tools could have already been done. The resulting drive/disk image copy can include all files, slack space, and partial files that is of interest to an analyst. Previously unknown files and partial files can be added to the server side (e.g., central site 110) database 190.

The remote site 100 (e.g., the client-side) can include, or have access to, a hash database 180 that contains the hashes of both the files and disk clusters (e.g., both physical and logical hashes). The database 180 can contain no data other than the hashes. The hash database 180 can be used by the remote site 100 so that when redundant data is excluded, the skeleton image 161 includes a hash corresponding to the redundant data instead of the data content.

The central site 110 (e.g., a server side) can use a database 190 (e.g., MySQL database) that can include two tables. The tables can be used by the central site 110 to reconstruct an image copy based on the hash values in the skeleton image 161. The hash values in the skeleton image 161 can be used to retrieve files and disk clusters from a local repository 160. One table can be for known/redundant files and the other can be for known/redundant disk clusters. The "known_files" table can include one field, for example, the file's hash value. Since the files are stored in a hash tree, the hash value can also serve as the file name and path to the file (e.g., so that the file content can be retrieved from the file repository 160). The hash value can be stored (e.g., in binary format using MySQL's BINARY data type). The hash value can be indexed to provide faster lookup times. In some embodiments, the "known_clusters" (e.g., known, redundant, partial files) table can include two fields, such as, the disk cluster hash and the disk cluster's contents. The disk cluster's hash value can be stored (e.g., as a BINARY field), and the content of the cluster can be stored (e.g., as a binary large object (BLOB)). The hash value field can be indexed for faster lookup times.

In addition to the database 190, the central site 110 (e.g., a server side) can maintain, or have access to, a repository of known data 160 (e.g., files) to rebuild the original disk image. The repository's 160 directory structure can be arranged in a hash tree configuration where files are named according to their hash values and placed in directories corresponding to what those values are. This can improve access time since there is no lookup step required to locate a file. It also allows for scalability since the leaves of the tree can be distributed evenly across several physical volumes. Individual disk clusters can also be stored in the database 190, for example, as BLOBs. Typically, pulling files from a file system (e.g., repository 160) can be faster than pulling them from a database (e.g., database 190). However, due to the relatively small size of a disk cluster and the number of clusters to be processed, the extra overhead of opening and closing millions of small files can cause a significant decrease in speed. Testing indicated a fivefold increase in speed when disk clusters were stored in the database 190 rather than on the file system (e.g., repository 160). When central site (e.g., a server side) receives a skeleton image 161, it is not necessary to rebuild this image into its original state. The image can be permanently stored as its skeleton 161 and rebuilt only when needed in its original state. This offers a percentage of space savings that correlates to the percentage of transmission time savings.

To reduce the transmission times of drive images and to use the uplink bandwidth efficiently, there can be no communication between the remote site 100 and the central site 110 until transmission is initiated. The remote site's 100 (e.g., client side) process of creating a skeleton image 161 from the original image 120 can be done in a stand-alone environment. This can be accomplished by the pre-deployment of the client side database. At the point of transmission, the sender 140 and receiver 150 can choose whatever method of file transfer (e.g., over a communications network 130 using a transmission protocol) best utilizes the available bandwidth (e.g., ftp, email, etc.).

In some embodiments, when a skeleton image 161 is sent to the server-side (e.g., central site 110), the remote site 100 (e.g., client-side) assumes that the central site (e.g., server-side) has correctly ingested each new file. For example, when either site 100 and 110 sees new data (e.g., a file that is not redundant or duplicative of a locally stored file or disk cluster), each corresponding database 180 or 190 of hashes of files and clusters can be updated. Therefore, the next time the file/disk cluster is encountered, a hash value can be used instead of including the data content. By making this assumption, both sides can update their own hash databases 180 and 190 when a new file is seen. The advantage to this scheme is that it uses less bandwidth than other update options. The disadvantage is that this only works when there is one client and one server. A second option to address the update problem is sending periodic updates to the remote site 100 (e.g., client-side). Unlike the previous update solution, this ensures proper synchronization between the remote site 100 and central site 110 operations. The disadvantage to this solution is that it introduces additional communication between the remote site 100 and the central site 110. Additionally, duplicates that could have been identified in disks/drives ingested between identification of the file and updates being sent can be missed.

Figure 2:
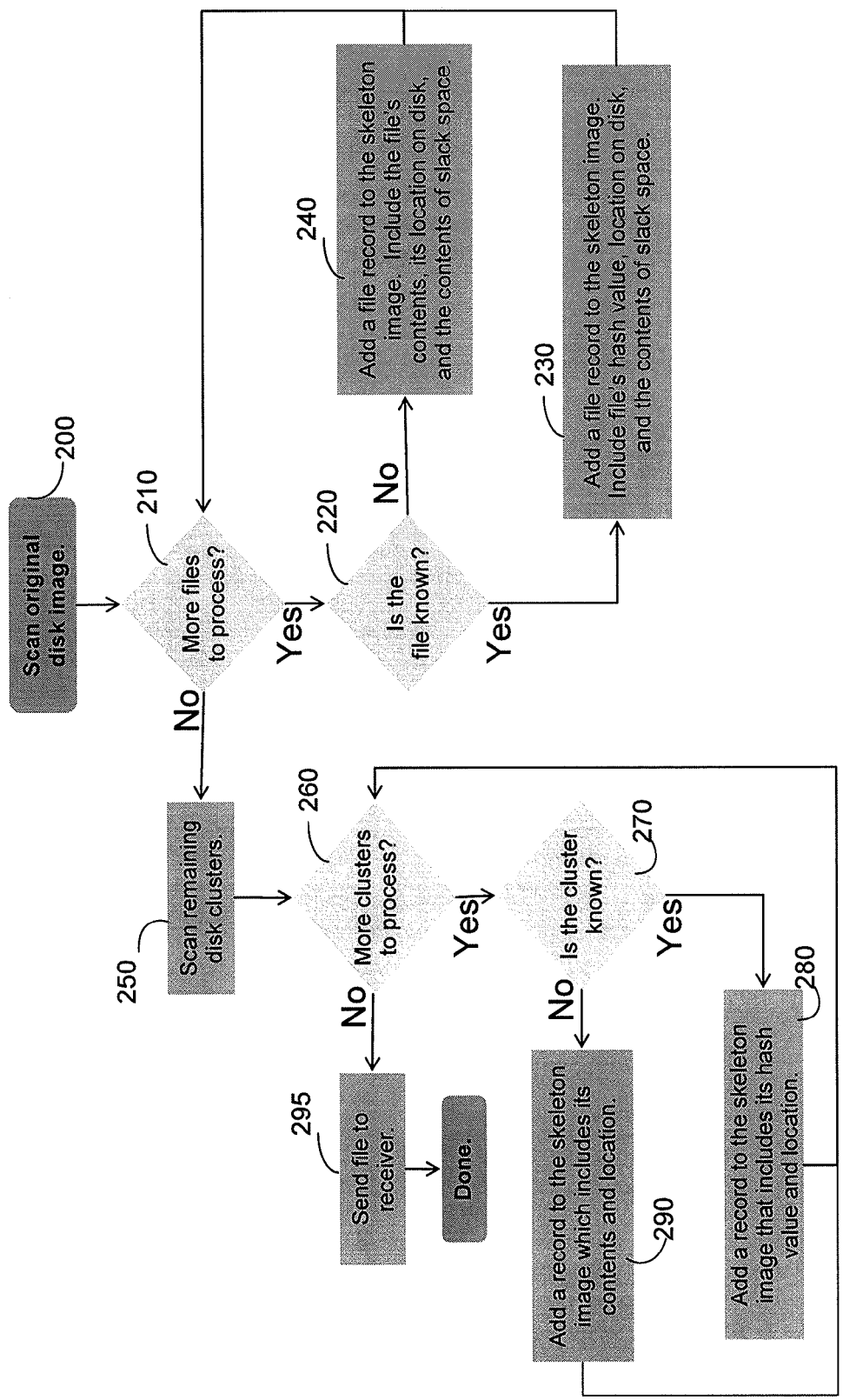
FIG. 2 is a flowchart showing the steps for generating and transmitting a skeleton image of a disk/drive image, according to an illustrative embodiment of the invention.

FIG. 2 is a flowchart showing the steps for generating and transmitting a skeleton image of a drive/disk image, according to an illustrative embodiment of the invention. The skeleton image (e.g., skeleton image 161 of FIG. 1) can be used to transfer an image (e.g., a forensically sound image) of a computer readable storage medium (e.g., disk/drive) across, for example, a low bandwidth communications network (e.g., network 130 in FIG. 1). The image of a computer readable medium (e.g., an original disk image 120 of FIG. 1) can be processed to generate a skeleton image that includes "unique" data. The original disk/drive image can be scanned (step 200) to identify and exclude redundant/known data (e.g., data duplicative of locally stored of data) (steps 210 and 220) to generate a skeleton image. Redundant data content can be excluded from the image and replaced with corresponding hash values (e.g., a hash for a redundant file, redundant file sequence, or redundant disk cluster) (steps 230 and 280). In some embodiments, hash values of empty space, patterned space are also included in the skeleton image. Once all the files and disk clusters in the image have been processed, the skeleton image can be transmitted over a communications network to a receiver (e.g., a receiving device as shown in FIG. 1) (step 295) to enable reconstruction of an image copy of the computer readable storage medium using the skeleton image and the locally stored data. A location identifier specifying a location of data (e.g., each file, disk cluster, empty space, or patterned space, etc.) on the image of the computer readable storage medium can also be included in the skeleton image and transmitted. By including hashes of known data and location identifiers in the skeleton image, a forensically sound or analytically sound duplicate of an original image (e.g., a bit-for-bit copy of a disk/drive image 170 of FIG. 1) can be reconstructed by using pieces of other drives/other images (e.g., locally stores of data 160 of FIG. 1).

The image of the disk/drive can be scanned (step 200) for redundant data such as, for example, redundant files, redundant file sequences (steps 210-220) or redundant disk clusters (steps 260-270) duplicative of known or locally stored files, file sequences or disk clusters. Hashes of files, hashes of file sequences or hashes of disk clusters can be compared with a database of locally stored hashes of files, locally stored hashes of file sequences or locally stored hashes of disk clusters to identify redundant data in the image. A hash database can be stored, for example, at a remote site and the central site (e.g., as described in FIG. 1). Locally stored data can be stored on the receiving device (e.g., client site 110 as shown in FIG. 1). A skeleton image can be generated by excluding redundant data or data corresponding to empty or patterned space in the computer readable storage medium. In some embodiments, the skeleton image corresponds to data in the computer readable storage medium ready to be analyzed and the skeleton image can be transmitted to enable analysis of the skeleton image.

The image can be first scanned to process files and then scanned to process disk clusters to generate a skeleton image. To process files, the file is compared with locally stored files to determine if the file is redundant or known (steps 210-220). When new disk image is scanned, a hash value is computed for each file and compared to the known hash database. A corresponding file record can also be included for each file in the skeleton image. If the file is not redundant (e.g., "unique" and not known as compared to hash values in a hash database such as database 180 of FIG. 1) then the file record includes, for example, the file's contents, a location identifier (e.g., the file's location on the disk image), and contents of slack space (step 240). The file content along with a record describing how it is stored on disk can be copied to the skeleton image so that the file segments can be properly placed at the server side (e.g., upon reconstruction of the image copy) and so that a physical hash of the area containing the file can be validated. If a file is known (e.g., there is a corresponding locally stored file), it is not copied to the skeleton image, but replaced with a record including, for example, its logical hash value, a location identifier (e.g., the file's location on the disk image) and contents of slack space (e.g., slack space data that identifies the end of a file in a block space) (step 230). By including hash values for known/redundant files and disk clusters, the transmission of data via a communications network between, for example, a remote site and a central site can be minimized. The location identifier (e.g., information regarding where it is stored on disk) for known and unknown files are important for maintaining forensic integrity (e.g., block by block fidelity).

After processing all of the files, the "free space" (e.g., sections of the disk/drive image which the file system considers to be empty) can be scanned (steps 250-270). This area often contains partial files and residual copies of deleted files (e.g., disk clusters). These can be captured as well in order to preserve the forensic integrity of the image. The free space can be scanned and the contents of every unused disk cluster can be recorded to ensure that every block of data on the disk is accounted for. In addition to recognizing known files, known disk clusters can also be recognized. Like the files, disk clusters can be recognized by their hash values. As previously described, both the sender and receiver maintain a list of hash values for known clusters (e.g., databases 180 and 190 of FIG. 1). When the free space is scanned on the new client drive, a hash value is computed for each disk cluster and compared to the known clusters hash database (e.g., database 180 of FIG. 1). A record corresponding to each disk cluster can be included in the skeleton image. If a cluster is known, only its hash value and location are stored (step 280). For example, if the disk cluster is redundant with local stores of disk clusters, then the record includes, for example, a hash value for the disk cluster and a location identifier (e.g., a disk cluster's location on the disk image). If a cluster is unknown, its contents and location are stored in the skeleton image (step 290). For example, if the disk cluster is not redundant with local stores of disk clusters (e.g., "unique") then the file record includes, for example, the contents of the disk cluster and a location identifier (e.g., a disk cluster's location on the disk image).

A skeleton image that includes "hashes" of known data (e.g., files and disk clusters) can reduce the amount of data sent across slow WAN links by about 50% to about 70%. A standard compression algorithm can be applied to the skeleton image (e.g., generated by steps 200-290). The unknown data (e.g., unique files and disk clusters that are not redundant of local stores of data) can include long runs of zeroes (sparseness), making the skeleton image a good candidate for compression. All drives can be compressed as a last step before transmitting.

In some embodiments, blocks assigned to a file will be contiguous. Instead of hashes of individual files (e.g., as in step 230), an identifier (e.g., a hash value) that indicates a common sequence of blocks can be used, thereby further minimizing the amount of data that needs to be transferred. Two methods of identifying sequences can be used. A first method can work at a high level of abstraction (e.g., files) and can work at a lower level when needed. The second method can work at a low level of abstraction (e.g., physical sectors or logical clusters) and can work at a higher level when needed. Large regions of the images of drives/disks can include "empty" (e.g., contain no user data) or patterned space. Drive formatting can fill blocks with repeating sequences which are often but not always zeros. Sending an identifier (e.g., a hash value in the skeleton image), which indicates a sequence of these blocks of empty or patterned space, can minimize data to transmit over a communications network.

A one-way hash function (e.g., SHA-256 hash algorithm) that is collision-resistant with respect to security and size (e.g., where size refers to the server-side data store) can be used for the data in the image (e.g., files and disk clusters) (steps 230 and 280). The number of files in the server side data store (e.g., data repository 160 of FIG. 1) can be less than $2^{N/2}$ where N is the length of the hash to avoid a probable collision (greater than about 50%). By way of example, if the implementation requires to have a less than 1% chance of collision when using a 256 bit hash, the number of items in the repository is fewer than 4.8e1037. Instead of sending full hashes as the metadata (steps 230 and 280) to represent a chuck of known data, gains can be achieved by sending indexes of hashes instead of the hashes themselves.

Figure 3:
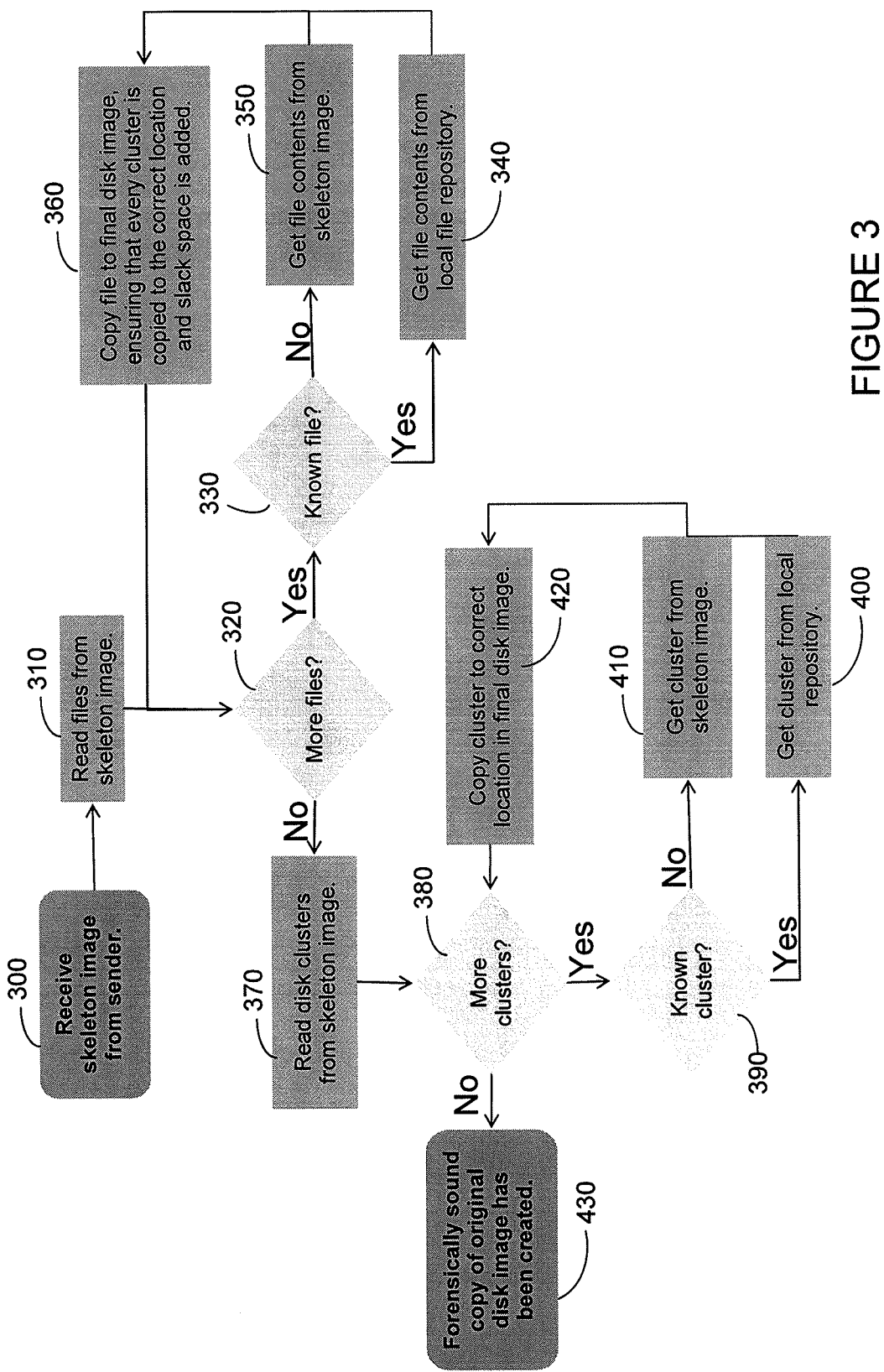
FIG. 3 is a flowchart showing the steps for reconstructing a copy of the drive image, according to an illustrative embodiment of the invention.

FIG. 3 is a flowchart showing the steps for reconstructing a copy of the drive image, according to an illustrative embodiment of the invention. A skeleton image (e.g., generated by steps 200-290 in FIG. 2 and image 161 in FIG. 1 above) can be received from a sender (e.g., a transmitting device 140 from a remote site 100 as shown in FIG. 1) via a communications network (e.g., network 130 in FIG. 1) and processed (steps 310-430) to reconstruct a forensically sound (e.g., bit for bit copy such as image copy 170 in FIG. 1) or analytically sound copy of the image. The data in the skeleton image can be compiled with local stores of data (e.g., files and disk clusters) to generate the copy of the original image. Since each file and/or disk cluster in the image has a corresponding location identifier, each file/disk cluster can be copied into the same location as the original image, thereby enabling reconstruction of a forensically sound, bit for bit image copy. The resulting image copy (step 430) can be a compilation of unique file contents/disk clusters from the skeleton image and file contents/disk clusters from a local repository.

As noted above in FIG. 2, the skeleton image (e.g., generated by steps 200-290 in FIG. 2) can be generated based on the original disk/drive image by excluding redundant data duplicative of locally stored data. The received skeleton image can include at least one hash value in place of or instead of the redundant data (e.g., for at least one of a redundant file, redundant file sequence, redundant disk cluster) and at least one location identifier specifying a location of the redundant data on the image of the computer readable medium. The skeleton image can also include a hash value for empty space or patterned space.

The files in the skeleton image can be scanned and processed (steps 310-330). If the file is known and redundant, than the file contents are retrieved from the local stores of files (e.g., local file repository) using the hash value from the skeleton image (step 340). If the file is not known/redundant (e.g., unique), then the skeleton image will have the file contents (step 3350). In some embodiments, the unique file can be added to update the local repository/database of files for future use so that next time a skeleton image is generated a hash value for the file can be used instead of including the file content in the skeleton image. Each file, whether unknown (e.g., and retrieved from the skeleton image in step 350) or known (e.g., and retrieved from the repository in step 340) has a corresponding location identifier and data corresponding to slack space of the file which enables reconstruction of the forensically sound image copy. Based on the location identifier, the file contents in the skeleton image and any local stores of files can be copied to the correct location on the image copy (step 360). Furthermore, the correct amount of slack space can be added to each file (e.g., file content in the skeleton image or file content from local file repository) (step 360).

After the files and hashes of files are processed in the skeleton image, the disk clusters are read and processed (steps 370-390). If the disk cluster is known and redundant to locally stored disk clusters, then the skeleton image will include a hash value (step 400). The hash value can be used to retrieve a disk cluster from the local repository. If the disk cluster is not known/unique, then the skeleton image will have the disk cluster (step 410). In some embodiments, the unique disk cluster can be added to update the local repository/database for future use so that next time a skeleton image is generated, a hash value for the disk cluster can be used instead of including the disk cluster content in the skeleton image. Disk clusters, whether known (e.g., and contents retrieved from the local repository in step 400) or unknown (e.g., and contents retrieved from the skeleton image in step 410) will have a corresponding location identifier. Based on the location identifier, the disk clusters can be copied in the correct location in the final image copy (step 420). A forensically sound image copy can therefore be generated based on data (e.g., files, disk clusters, and empty/patterned space) content from the skeleton image or a data repository, the data placed in the correct location based on each corresponding associated location identifier (step 430).

A receiving device (e.g., as shown in FIG. 1) can reconstruct the image copy of the computer readable storage medium using a database of locally stored hashes of files, locally stored hashes of file sequences or locally stored hashes of disk clusters. The resulting image copy (step 430) can be a compilation of unique data from the skeleton image and data from a local repository. In some embodiments, the receiving device reconstructs the image copy by, for example, inserting locally stored data in the skeleton image, the locally stored data duplicative of the redundant data excluded by the transmitting device. For example, reconstruction of the image copy can also be made by compiling the locally stored data (e.g., corresponding to known/redundant data) with the data in skeleton image (e.g., corresponding to unknown/unique data) based, at least in part, on the received hash value of the redundant data and the received location identifier of the redundant data. Locally stored data can be retrieved based on the received hash value of the redundant data. The locally stored data can be inserted at the correct location in the image copy based on the location identifier.

The above-described techniques can rely on an external support application, such as, for example, a Java. External support applications can be file system specific. A file system can store objects differently and a parser can be written for the file system. The system can be modular in that a parser can be written for the system to support any external support application. The new parser can be deployed without any modifications to the system's source code. By way of example, where the above-described techniques are implemented in a Java application, a NTFS parser can be utilized to read the disk image and generate an XML file describing the layout of the disk. The XML file can be used to read the image and access files.

The above-described techniques can be implemented in digital electronic circuitry, or in computer hardware, firmware, software, or in combinations of them. The implementation can be as a computer program product (i.e., a computer program) tangibly embodied in an information carrier (e.g., in a machine-readable storage device or in a computer readable storage medium/device/apparatus, such as, for example, memory or disks), for execution by, or to control the operation of, data processing apparatus, e.g., a programmable processor, a computer, or multiple computers. The computer program product can include instructions operable to cause a data processing apparatus to implement the above-described techniques. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. While the invention has been particularly shown and described with reference to specific illustrative embodiments, it should be understood that various changes in form and detail may be made without departing from the spirit and scope of the invention. The alternatives described herein are examples for illustration only and not to limit the alternatives in any way. The steps of the invention can be performed in a different order and still achieve desirable results.

What is claimed is:

1. A method comprising:
   transferring a forensically sound image of a computer readable storage medium across a low bandwidth communications network;
   scanning an image of the computer readable storage medium for redundant data, the redundant data duplicative of locally stored data;
   generating a skeleton image based on the image of the computer readable storage medium by excluding the redundant data from the image of the computer readable storage medium; and
   transmitting, by a transmitting device, the skeleton image over the communications network to a receiving device to enable reconstruction of an image copy of the computer readable storage medium using the skeleton image and the locally stored data.

2. The method of claim 1, wherein generating comprises excluding the redundant data by including a hash value in place of the redundant data in the skeleton image.

3. The method of claim 1, further comprising scanning the image of the computer readable storage medium for redundant files, redundant file sequences or redundant disk clusters duplicative of locally stored files, locally stored file sequences or locally stored disk clusters.

4. The method of claim 1, further comprising generating the skeleton image by excluding data corresponding to empty or patterned space in the computer readable storage medium.

5. The method of claim 1, further comprising transmitting a location identifier that specifies a location on the image of the computer readable storage medium and a hash for at least one of a redundant file, redundant file sequence, redundant disk cluster, empty space or patterned space.

6. The method of claim 5, further comprising transmitting data corresponding to slack space identifying an end of the redundant file.

7. The method of claim 1, wherein the locally stored data is stored on the receiving device.

8. The method of claim 1, further comprising transmitting the skeleton image over the communications network using a transmission protocol.

9. The method of claim 1, further comprising comparing hashes of files, hashes of file sequences or hashes of disk clusters in the image of the computer readable storage medium with a database of locally stored hashes of files, locally stored hashes of file sequences or locally stored hashes of disk clusters to identify redundant data in the image of the computer readable storage medium.

10. The method of claim 1, further comprising reconstructing, by the receiving device, the image copy of the computer readable storage medium using a database of locally stored hashes of files, locally stored hashes of file sequences or locally stored hashes of disk clusters.

11. The method of claim 1, further comprising reconstructing, by the receiving device, the image copy of the computer readable storage medium by inserting the locally stored data in the skeleton image, the locally stored data duplicative of the redundant data excluded by the transmitting device.

12. The method of claim 1, wherein the image copy is a bit-for-bit copy of the image of the computer readable medium.

13. A method for reconstructing a bit-for-bit copy of an image of a computer readable medium, the method comprising:
receiving a skeleton image via a communications network, the skeleton image generated by excluding redundant data duplicative of locally stored data from the image of the computer readable medium;
receiving at least one hash value for the redundant data and at least one location identifier specifying a location of the redundant data on the image of the computer readable medium; and
reconstructing a bit-for-bit copy of the image of the computer readable medium by compiling the locally stored data with the skeleton image based, at least in part, on the received hash value of the redundant data and the received location identifier of the redundant data.

14. The method of claim 13, further comprising receiving at least one hash value or at least one location identifier for at least one of a redundant file, redundant file sequence, redundant disk cluster, empty space or patterned space.

15. The method of claim 13, further comprising retrieving locally stored data based on the received hash value of the redundant data.

16. A computer program product, tangibly embodied in a computer readable storage medium, including instructions operable to cause a data processing apparatus to:
transfer a forensically sound image of a second computer readable storage medium across a communications network;
scan an image of the second computer readable storage medium for redundant data, the redundant data duplicative of locally stored data;
generate a skeleton image based on the image of the second computer readable storage medium by excluding the redundant data from the image of the second computer readable storage medium; and
transmit, by a transmitting device, the skeleton image over the communications network to a receiving device to enable reconstruction of an image copy of the second computer readable storage medium using the skeleton image and the locally stored data.

17. The product of claim 16, wherein the skeleton image is generated by including a hash value in place of the redundant data.

18. A computer program product, tangibly embodied in a computer readable storage medium, for reconstructing a bit-for-bit copy of a second computer readable storage medium, the computer program product including instructions operable to cause a data processing apparatus to:
receive a skeleton image transmitted via a communications network, the skeleton image generated by excluding redundant data from the image of the second computer readable medium, the redundant data duplicative of locally stored data;
receive at least one hash value for the redundant data and at least one location identifier specifying a location of the redundant data on the image of the second computer readable medium; and
reconstruct a bit-for-bit copy of the image of the second computer readable medium by compiling the locally stored data with the skeleton image, based, at least in part, on the received hash value of the redundant data and the received location identifier of the redundant data.

19. The method of claim 1, wherein generating the skeleton is such that skeleton image includes non-redundant data in the computer readable storage medium.

20. The method of claim 1, further comprising scanning the image of the computer readable storage medium for redundant files, redundant file sequences or redundant disk clusters.

* * * * *